United States Patent [19]

Yokokura et al.

[11] Patent Number: 4,812,042

[45] Date of Patent: Mar. 14, 1989

[54] HOLOGRAPHIC INTERFEROMETER

[76] Inventors: Takashi Yokokura, Hino; Takashi Gemma, Shibuya; Takuji Satoh, Suginami, all of Japan

[21] Appl. No.: 96,609

[22] Filed: Sep. 11, 1987

Related U.S. Application Data

[62] Division of Ser. No. 898,323, Aug. 20, 1986, Pat. No. 4,758,089.

[30] Foreign Application Priority Data

Aug. 22, 1985 [JP] Japan .................. 60-184460
Aug. 22, 1985 [JP] Japan .................. 60-184461
Aug. 22, 1985 [JP] Japan .................. 60-184464

[51] Int. Cl.$^4$ .............................. G01B 9/02
[52] U.S. Cl. .................. 356/348; 356/360; 356/401
[58] Field of Search .......... 356/347, 348, 401, 359, 356/360

[56] References Cited

U.S. PATENT DOCUMENTS 3,871,769  3/1975  Engel et al. ............... 356/347 X

Primary Examiner—Davis L. Willis
Assistant Examiner—Matthew W. Koren
Attorney, Agent, or Firm—Brumbaugh, Graves, Donohue & Raymond

[57] ABSTRACT

A holographic interferometer comprising a source of laser beams, a condenser lens for converging a laser beam supplied from said laser-beam source, a pinhole which allows the passage of said converged laser beam, a collimator lens having a focal point which lies on said pinhole, a beam splitter disposed in an inclined manner between said pinhole and said collimator lens, a spacial filter disposed on the optical axis of a light reflected from said beam splitter and at an optically conjugate position relative to said pinhole, and a hologram standard disposed between said spacial filter and said beam splitter.

10 Claims, 11 Drawing Sheets

FIG. 8
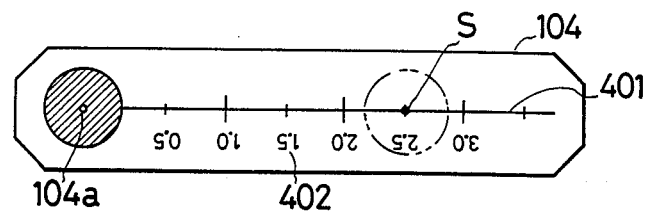
FIG. 9      FIG. 10
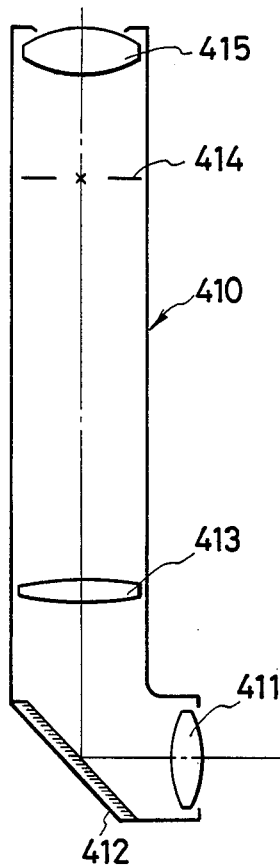 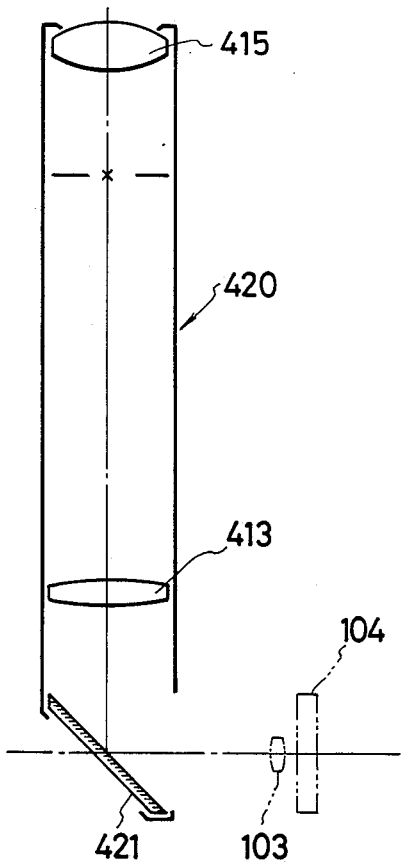

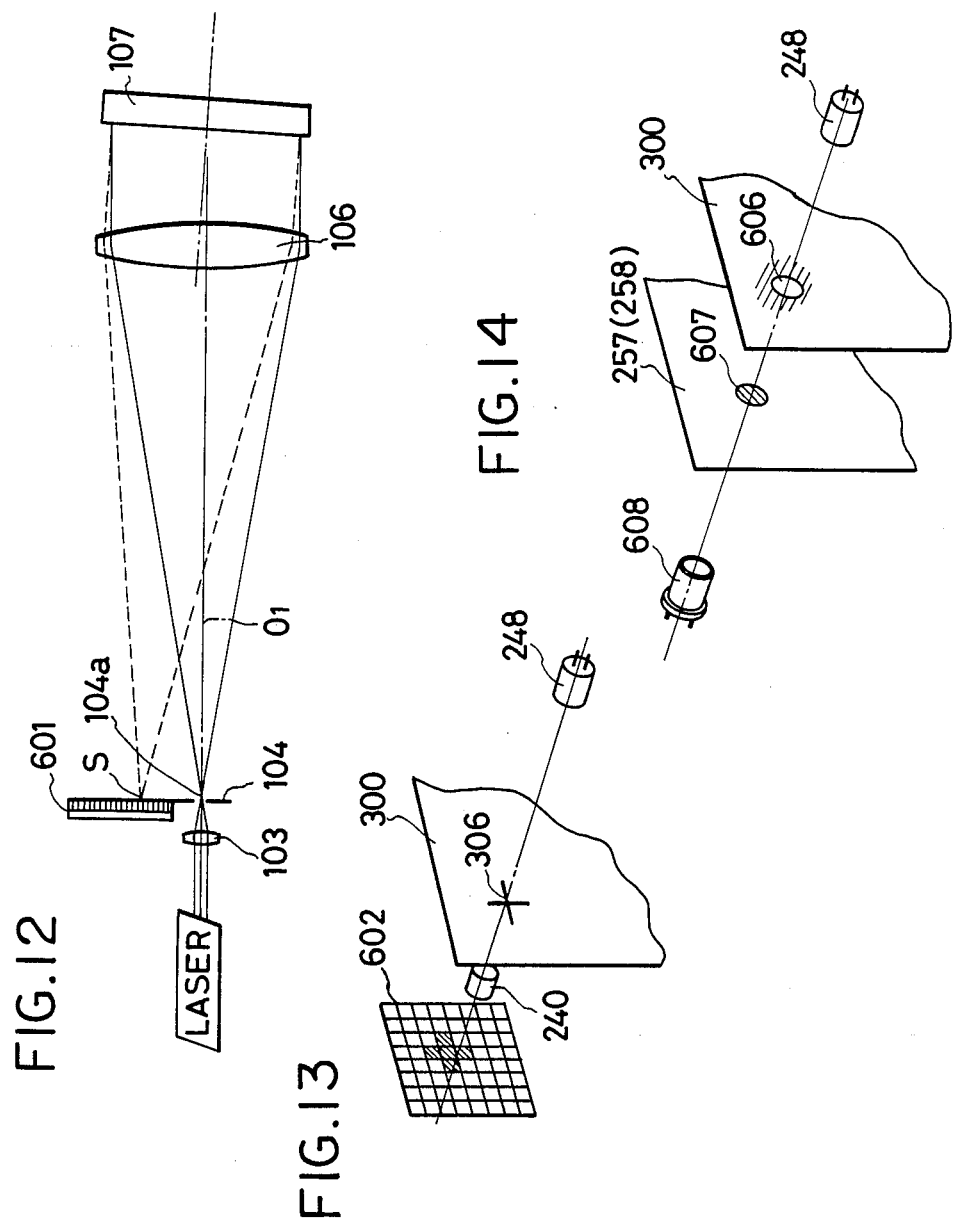

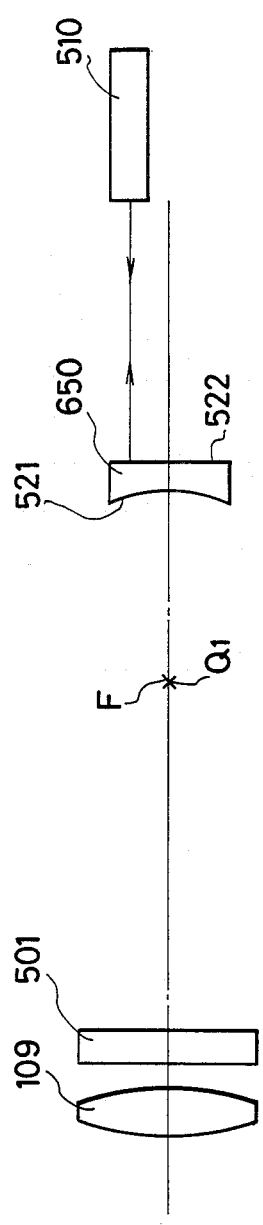
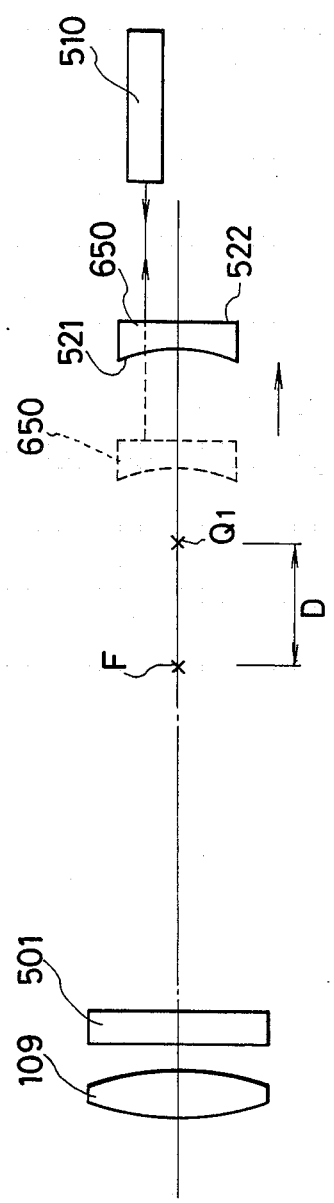
FIG.17A
FIG.17B

HOLOGRAPHIC INTERFEROMETER

This application is a division of application Ser. No. 898,323 filed on Aug. 20, 1986 now U.S. Pat. No. 4,758,089.

BACKGROUND OF THE INVENTION

1. (Field of the Invention)

The present invention relates to a holographic interferometer for precisely measuring the surface configurations of optical elements such as lenses and mirrors, in particular, those of various aspherical optical devices.

2. (Description of the Prior Art)

Various proposals have heretofore been made with respect to a method of precisely measuring the surface configurations of aspherical optical elements, and, in particular, holographic interferometers are well known to those skilled in the art. A typical holographic interferometer utilizes a hologram standard including a hologram pattern formed by the interference between the wave front of a reference beam and the wave front of a beam reflected or transmitted by an aspherical reference surface, or a hologram standard including a so-called "computer hologram". A computer hologram is commonly made by an electron beam drawing method or the like, after obtaining a hologram pattern from the optical design value of an aspherical reference surface through an electronic computer. The beam reflected or transmitted by an aspherical optical element being measured is diffracted by one of these types of hologram standard, and the diffracted beam is made to interfere with a reference beam, thereby obtaining interference fringes. Finally, based on the physical number and the shapes of the thus-obtained interference fringes, precise measurement is made of the error, from the aspherical reference surface of the aspherical optical element being measured.

These holographic interferometers are typically classified into the following types: Twyman-Green type; Mach-Zehnder type; and Fizeau type. A Twyman-Green interferometer is generally arranged such that light rays supplied from a light source (a laser) are split into two light beams by a beam splitter, one of the beams being used as a reference beam while the other is made to pass through the optical element being tested and a hologram standard, so as to obtain light in diffraction. The diffracted beam light is made to interfere with the reference beam. A Mach-Zehnder interferometer commonly has a construction wherein light rays supplied from a light source (a laser) are split into two light beams by a beam splitter, one of the beams being converted into a reference beam by diffraction by a hologram standard while the other is shone onto the optical element being tested, thereby forming an object light beam, and both beams are made to interfere with each other.

A Fizeau interferometer has the construction shown in FIG. 18. As shown, a light beam emanating from a light source (laser) LS is collimated by a collimator lens C and is then reflected from a beam splitter BS which consists of an inclined half mirror disposed between a focusing lens $L_1$ and a divergent lens $L_2$. The reflected beam is then made to be incident upon the divergent lens $L_2$ as an incident light beam $l_1$. After the incident beam $l_1$ has been diverged by the divergent lens $L_2$, the diverged beam is made to be incident upon a spherical reference surface R. The incident beam is partially reflected by the surface R, returns along the same optical path as that of the incident light beam $l_1$, and passes through the beam splitter BS, a hologram standard H and the focusing lens $L_1$. Finally, the light beam passes through the opening of a spacial filter SF in the form of a zero-order reference beam.

In the meantime, the incident light beam transmitted through the spherical reference surface R is refleted by an optical element T being tested (or aspherical concave mirror), to obtain an object light beam. The object light beam is then made to travel in the reverse direction and is transmitted through the beam splitter BS. The component of the transmitted light beam which is not diffracted by the hologram standard H, that is, the zero-order light, is cut off by the spacial filter SF. On the other hand, the component of the transmitted light beam which is diffracted by the hologram standard H̲, for example, the first-order diffracted light beam, is passed through an opening in the spacial filter SF and forms interference fringes on an interference screen or photographic film as it is combined with the zero-order reference beams thereon.

(Problems to be Solved by the Invention)

The above-described dual optical path types of Twyman-Green and Mach-Zehnder interferometers have the following drawbacks. Since it is necessary to use a large number of optical components such as lenses and mirrors for each optical path, the structure becomes inevitably complicated and the manufacturing cost is increased. In addition, any difference or error in the production or the optical arrangement of the individual optical components directly affects the interference fringes which can be observed, thereby lowering the precision of the measurement.

The Fizeau interferometer described previously with reference to FIG. 18 has no drawbacks such as those of the dual optical path type of interferometers. However, the hologram standard H and the collimator lens C require substantially the same diameter, thereby raising a problem in that it is difficult to produce a hologram standard as a computer hologram.

In addition, since the inclined beam splitter BS is disposed within the parallel pencil of rays defined between the focusing lens $L_1$ and the divergent lens $L_2$, the diameter of the splitter BS becomes close to 1.5 times as large as that of the collimator lens C, thereby making it difficult to produce this type of interferometer with a high accuracy.

The Fizeau interferometer further involves the following disadavantage. If the optical piece to be tested is shaped in a greatly aspherical form, a high-density hologram pattern (or interference pattern) is formed on the hologram standard H. In this case, if a computer hologram is to be made by an electron beam drawing method, then huge quantities of calculations and drawing data are necessary.

As described above, prior-art interferometers have the disadvantage in that it is impossible to increase the size of each optical component and the density of the hologram pattern on the hologram standard. In consequence, only a test piece with a small diameter and a small degree of asphericality can be measured, owing to the small effective diameter of the conventional interferometer and the low density of the hologram.

While, a measurement method using an interferometer normally includes on-axis and off-axis measurement methods, the on-axis method is a method in which the object light reflected from a test piece is made to be coaxial with respect to the reference light from a reference surface. In this method, since the spacial frequency of the hologram standard used for measurement can be reduced, it is possible to measure a test piece which has a greatly aspherical surface. However, zero order and higher order lights diffracted by the hologram standard are superposed on the optical axis, although their focal lengths differ from one another. Even if a spacial filter is located at the focal position of the first-order diffracted light in order to select that light, the spacial filter allows the passage of part of the zero-order and second-order, and higher-order diffracted light. For this reason, the on-axis method has the disadvantage in that the central portion, including the optical axis, cannot be measured.

On the other hand, unlike the on-axis method, the off-axis method does not have the above-described portion which cannot be measured. However, when compared with the on-axis method, since the spacial frequency of the hologram standard is increased, only test pieces having small asphericality can be measured, because of limitations on alignment and the production of the hologram standard.

Since the off-axis angle depends on the kind and asphericality of each test piece, an optimum off-axis angle is determined before the hologram standard is produced. The holographic interferometer is so constructed that it is incapable of measuring by both the on-axis and off-axis methods, with the off-axis angle being variable.

Furthermore, in conventional interferometers the hologram standard must be precisely located at a predetermined position in order to carry out the measurement precisely. Location error of the hologram standard causes measurement error or lowers the measurement precision.

Conventionally, the adjustment for locating the hologram standard is carried out so that the optical piece to be tested is supported by holders and the interference pattern that appears is reduced the smallest one. However, it takes a long time to perform the above-mentioned adjustment and every time that the optical piece is to be tested, and both it and the hologram standard are exchanged for new ones, it is necessary to perform this adjustment.

(Summary of the Invention)

Accordingly, it is an object of the present invention to provide a holographic interferometer capable of measuring the surface configuration of even a test piece which has a large diameter and a large degree of asphericality.

It is another object of the present invention to provide a holographic interferometer which comprises a small number of components and wherein the individual components, in particular, a beam splitter and a hologram standard, have a low production cost so that high-precision measurements can be performed even with a low-precision hologram standard.

Another object of the present invention is to provide a holographic interferometer that is capable of measuring by both the on-axis and off-axis methods, with the off-axis angle being variable.

It is, furthermore, another object of the present invention to provide a method of setting a measurement hologram standard, and an apparatus for setting a measurement hologram standard that does not require an adjustment to be carried out for locating it every time the test piece and the hologram standard are exchanged for new ones.

According to the invention, there is provided a holographic interferometer comprising: a source of laser beams; a condenser lens for converging a laser beam supplied from said laser-beam source; a pinhole which allows the passage of said converged laser beam; a collimator lens having a focal point which lies on said pinhole; a beam splitter disposed in an inclined manner between said pinhole and said collimator lens; a spacial filter disposed on the optical axis of a light reflected from said beam splitter and at an optically conjugate position relative to said pinhole; and a hologram standard disposed between said spacial filter and said beam splitter.

According to another aspect of the invention there is provided a holographic interferometer comprising: a collimator lens for collimating light from a light source and projecting said collimated light on a piece being tested; a reference-beam producing element disposed on the side of ah exit of said collimator lens so as to reflect part of light from said collimator lens, thereby obtaining a reference beam; a beam splitter disposed on the side of an entrance of said reference-beam generating element, said beam splitter being inclined with respect to the direction normal to the optical axis of said collimator lens in order to reflect said reference and object light scattered from said test piece; a hologram standard disposed on the optical axis of light reflected by said beam splitter; and an observation optical system for observing interference fringes between said object light diffracted by said hologram standard and said reference beam, wherein said reference-beam generating optical element can be made to be inclined with respect to the direction normal to said optical axis of said collimator lens, and said observation optical system can be swivelled through a given angle about a substantial center of an exit pupil of said collimator lens.

In still another aspect of the present invention, there is provided a method of setting a measurement hologram standard comprising the steps of: locating an adjustment hologram standard with a first alignment mark at a predetermined position; aligning an index on a reticle of an alignment optical system with said first alignment mark; and locating a measurement hologram standard having a second alignment mark so that said second alignment mark agrees with said index, said second alignment mark being formed at a position geometrically equivalent to that of said first alignment mark.

Another aspect of the present invention provides an apparatus for setting a measurement hologram standard comprising: an adjustment hologram standard having a first alignment mark; holder means for selectively holding an adjustment hologram standard and a measurement hologram standard having a second alignment mark geometrically equivalent to the position of said first alignment mark; alignment means for locating said adjustment hologram standard at a predetermined position by said holder means; and alignment optical systems respectively having a movable reticle which is disposed on said holder means and has an index so formed as to correspond to said first and second alignment marks.

The above and other objects and features of the present invention will become apparent from the following descriptions of the preferred embodiments and referring to the accompanying drawings.

(Brief Description of the Drawings)

FIG. 8 is a schematic illustration of one example of a pinhole reticle plate incorporated in this embodiment;

FIG. 9 is a schematic illustration of the optical arrangement of an off-axis adjustment microscope adapted to be incorporated in this embodiment;

FIG. 10 is a schematic illustration similar to FIG. 9, showing the optical arrangement of the on-axis adjustment microscope adapted to be incorporated in this embodiment;

FIG. 12 is a schematic illustration of the optical arrangement of one modification of the pinhole reticle plate in accordance with the present invention;

FIGS. 13 to 16 are respectively schematic illustrations of modifications of the alignment marks of the hologram standard and the alignment optical system which can be applied to this embodiment;

FIGS. 17A to 17B are schematic views of other methods of setting the adjustment hologram standard;

(DETAILED DESCRIPTION OF THE PREFERRED EMBODIMENTS)

A preferred embodiment of the holographic interferometer of the present invention will be described in detail below, with reference to the accompanying drawings.

A. General Optical Construction

Figure 1:
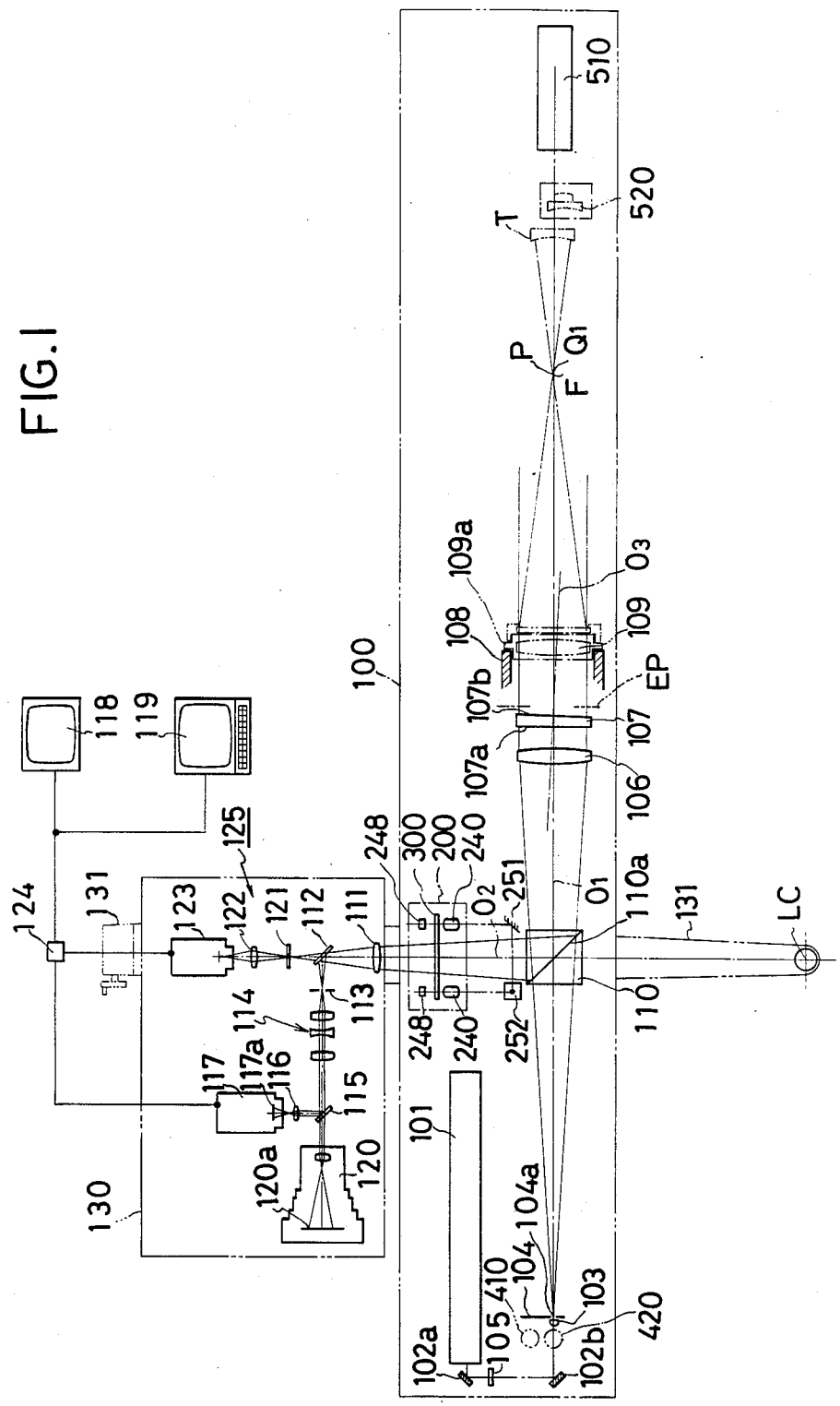
FIG. 1 is a schematic illustration of the general construction of a preferred embodiment of a holographic interferometer in accordance with the present invention.

FIG. 1 is a diagram of the general optical construction of a preferred embodiment of the holographic interferometer of this invention. A light beam emanates from a laser 101 which acts as a light source, and, after the optical path of the beam has been changed by mirrors 102a and 102b, the beam is converged into the form of a spot by a condenser lens 103. A reticle plate 104 having a pinhole 104a is disposed in the vicinity of the thus-converged spot. When the converged light beam passes through the pinhole 104a, it diverges, thus acting to make the pinhole 104a function as a secondary source of light. A quarter wavelength plate 105 is disposed between the mirrors 102a and 102b.

A collimator lens 106 is disposed in such a manner that its focal point lies on the pinhole 104a. The light beam which has diverged through the pinhole 104a to form a secondary light source is collimated by the collimator lens 106. A reference flat plate 107 is disposed behind the collimator lens 106 (on the right side of the lens 106 is viewed in FIG. 1), and a front surface 107a of the flat plate 107 (the surface closer to the collimator lens 106) is disposed perpendicularly to an optical axis $O_1$ (the optical axis of the collimator). On the other hand, a rear surface 107b of the plate 107 (the surface opposite to the surface 107a) is inclined at slight angles to the front surface 107a, to prevent the results of measurements from being affected by the interference formed between the lights reflected from the surfaces 107a and 107b.

If a test piece T is a concave object such as an aspherical concave mirror, a reference lens 109 mounted on a lens barrel 108 is disposed behind the reference flat plate 107 (on the side of the plate 107 nearer the test piece T). The collimated light beam transmitted through the reference flat plate 107 is focused on a point P by the reference lens 109, and the focused beam again diverges, and is incident on the test piece T, such as an aspherical concave mirror.

Object light and a reference beam are reflected from the test piece T and the front surface 107a of the reference flat plate 107, respectively. The object and reference light rays are incident upon a prism beam splitter 110 with a half-mirror surface 110a which is inclined relative to the optical axis $O_1$ and is located between the pinhole reticle plate 104 and the collimator lens 106. The incident object and reference lights are reflected by the half-mirror surface 110a, and enter a hologram standard 300 supported by a hologram standard holder 200, described later.

The laser 101, the mirrors 102a, 102b, the quarter wavelength plate 105, the pinhole reticle plate 104, the beam splitter 110, the collimator lens 106, the reference flat plate 107, the reference lens 109, the test piece T and the hologram standard holder 200 are arranged on a single common optical bench 100.

Figure 18:
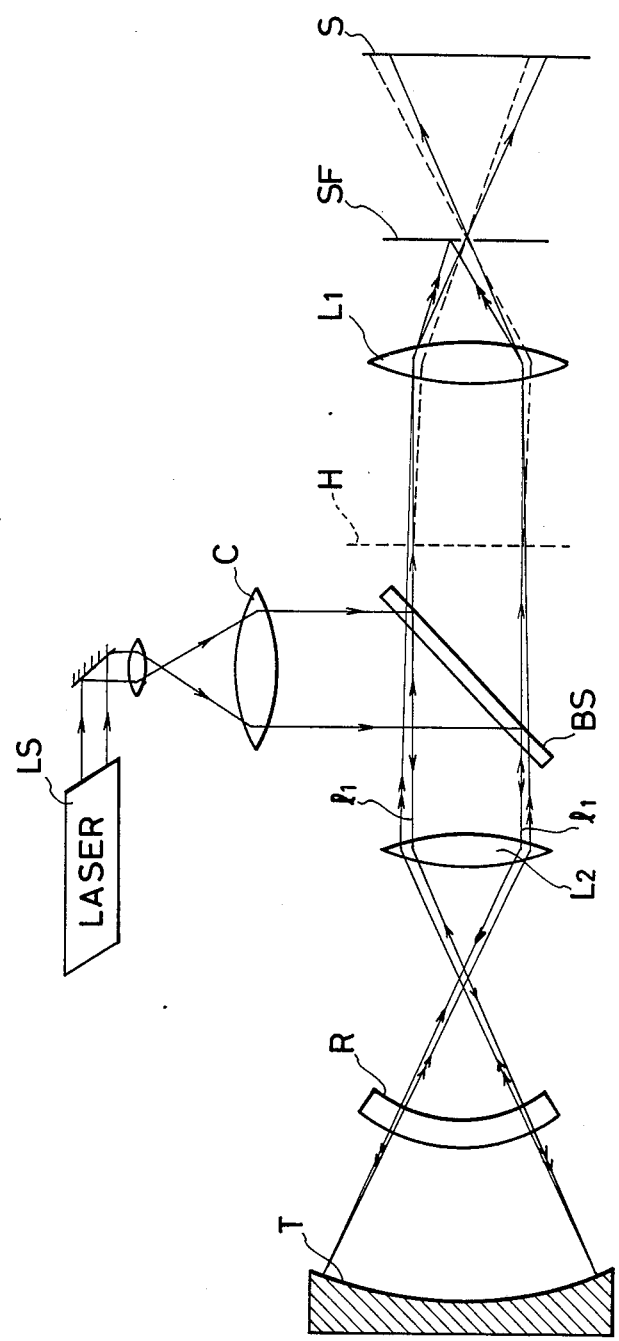
FIG. 18 is a schematic illustration of the optical arrangement of a conventional Fizeau type of interferometer.

The light transmitted through the hologram standard 300 is then focused on a spacial filter 113 through a focusing lens 111 and a half mirror 112. The spacial filter 113 is provided in order to selectively pass either the light diffracted by the hologram standard 300 or that which is not diffracted by the standard 300. More specifically, in the same manner as that of the prior-art Fizeau interferometer shown in FIG. 18, the spacial filter 113 selectively enables the passage of either the zero-order reference beam formed by the reference light from the reference flat plate 107, which is not diffracted by the hologram standard 300, or the first-order object light formed by the object light which is reflected from the test piece T and diffracted by the hologram standard 300. However, the filter 113 cuts off a reference beam in diffraction and the zero-order and second-order or higher diffracted lights obtained from the object light.

The object and reference light beams selected by the spacial filter 113 are passed through a zoom lens 114, a half mirror 115, and a focusing lens 116, and form an interference pattern on an image pickup plane 117a of a TV camera 117. The image picked up by the TV camera 117 is sent to an interference analysis device 119 which includes a monitor 118 and a personal computer (not shown). The reference and object light beams transmitted through the half mirror 115 form an interference pattern on the surface of a piece of photographic film 120a placed within an instant-development type of camera 120 for recording purposes, the interference pattern being the same as that formed on the image pickup plane 117a.

Part of the light beam passing through the focusing lens 111 is transmitted through the half mirror 112 and is then focused onto a reticle plate 121 which is provided with a cross-shaped pattern aligned with the optical axis. The light image formed on the reticle plate 121 is picked up by a TV camera 123 through an image pickup lens 122, and the picked-up image is displayed on the monitor 118 via a switching circuit 124. The reticle plate 121, image pickup lens 122, TV camera 123, and monitor 118 constitute an alignment optical system 125 for setting the test piece $\underline{T}$ within a measurement optical path.

The focusing lenses 111, 116, the half mirrors 112, 115, the spacial filter 113, the zoom lens 114, the image pickup lens 122, the TV cameras 117, 123 and the photographic camera 120 are arranged on an optical bench 130. The optical bench 130 is secured to an arm 131 to enable the adjustment of an off-axis angle, as described later, and the arm 131 is driven by the motion of a known micro-feed mechanism to enable free swivelling movement about the axis of a point LC which has a conjugate relationship with respect to an exit pupil EP of the optical system composed of the collimator lens 107 and the reference lens 109. It should be noted that, if the test piece T is a flat plate, the reference lens 109 is not needed. In this case, the point LC about which the arm 131 swivels is located in a conjugate relationship with respect to the center of the exit pupil of the collimator lens 106.

As described above, the present holographic interferometer is of the Fizeau type, so it is possible to greatly reduce the number of optical components when compared with Twyman-Green and Mach-Zehnder interferometers. The Fizeau interferometer disclosed in this application differs from the prior-art Fizeau ones in that the beam splitter is disposed within the divergent light beam defined between the collimator lens and the pinhole 104a, whereby the area of the half-mirror surface can be reduced to one quarter of that of a conventional interferometer having a beam splitter placed within the light beam collimated by its collimator lens.

Moreover, the reduced size of the half-mirror surface enables a prism type construction of the beam splitter. Therefore, as described later, it is possible to reduce the amount of computation and drawing information required for the drawing of hologram patterns. Since the size of the beam splitter is reduced, the accuracy of production can be greatly enhanced and its production costs reduced.

According to the present invention, the hologram standard is also arranged to be disposed within the convergent light beam reflected from the beam splitter. This arrangement permits a reduction in size and cost, and also enables high-precision drawing. The present invention can realise a holographic interferometer capable of accurately measuring a test piece of a large diameter or an aspherical test piece of a greatly aspherical surface.

B. Hologram Standard

Figure 2:
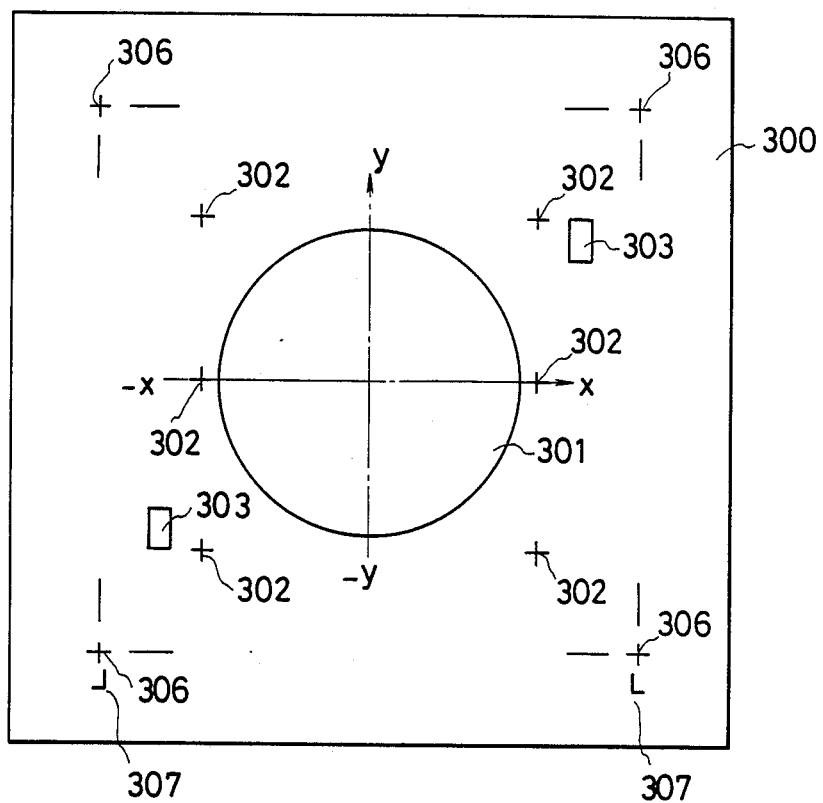
FIG. 2 is a plan view, schematically showing the construction of the hologram standard incorporated in the embodiment shown in FIG. 1.

FIG. 2 is a schematic plan view of the construction of the hologram standard incorporated in the holographic interferometer of this invention. As shown, the hologram standard 300 includes a central hologram pattern portion 301 constituted by a computer hologram.

Conventional types of interferometers have employed a mirror type of beam splitter to split and combine reference and object beam lights. In such a mirror type of beam splitter, if the obverse side of the mirror and the reverse side (or half-mirror surface) thereof are parallel to each other, the lights reflected from both sides interfere with each other, thereby adversely affecting the results of measurements. For this reason, in prior-art mirror-type beam splitters, the obverse side of the mirror is normally inclined so that it is not parallel, that is, at a slight angle to the reverse side thereof. In consequence, since there is no symmetry with respect to the optical axis, even if a hologram pattern is obtained by means of an on-axis type of hologram standard, it is necessary to obtain drawing data by calculating from data on each of the four quadrants.

Figure 4:
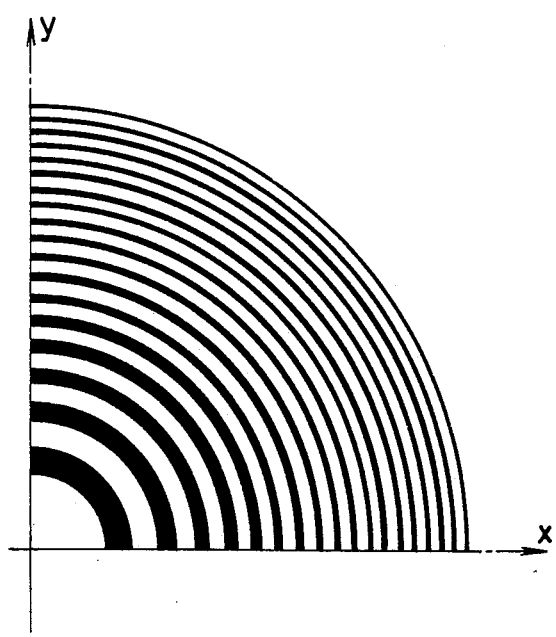
FIG. 4 is a schematic illustration of the first quadrant of one example of the hologram pattern shown in FIG. 2.

However, as described above, since the illustrated embodiment of this invention adopts the beam splitter 110 of a prism type, symmetry with respect to the optical axis can be maintained. Thus, a hologram standard of an on-axis type provides concentric hologram patterns having point symmetry. Therefore, pattern calculations and drawing-data operations as shown in FIG. 4 are made with respect to the first quadrant (x, y). Data on the second quadrant (−x, y), the third quadrant (−x, −y), and the fourth quadrant (x, −y) can be obtained through simple coordinate transformations of the first quadrant's data. This enables a reduction in the costs and time required for these operations. Furthermore, if the cost and time required for the calculation and operation of data on quadrants are applied to the operation of hologram patterns and the production of drawing data, it is possible to obtain more accurate data.

A plurality of cross-shaped distortion inspecting patterns 302 are formed around the hologram pattern portion 301, these patterns 302 being drawn during the step of drawing the hologram pattern by electron-beam scanning. Each of the distortion inspecting patterns 302 is compared with a corresponding preformed reference pattern, so that it is possible to obtain the degree of the distortion of the hologram pattern from the offsets between the patterns 302 and the corresponding reference patterns.

Figure 3:
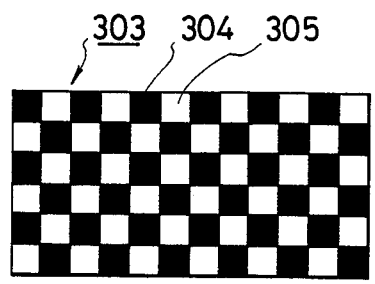
FIG. 3 is a schematic illustration of a black/white-ratio inspection pattern formed on the hologram standard shown in FIG. 2.

As shown, two black/white-ratio inspection patterns 303 are formed outside of the distortion inspecting patterns 302. Each of the black/white-ratio inspection patterns 303 has a checkboard pattern in which a plurality of black segments 304 and white segments 305 of the same areas are alternately arranged in a flat manner, as shown in FIG. 3.

The black/white-ratio inspection patterns 303 are drawn during the step of drawing the hologram pattern 301 by an electron beam. Accordingly, if the ratio of black to white of each black/white-ratio inspection pattern 303 is measured by a densitometer, it is possible to indirectly obtain the ratio of white to black of the hologram pattern itself.

Cross-shaped alignment marks 306 are formed at the four corners of the hologram standard 300 so as to enable alignment when the hologram standard 300 is mounted on the hologram standard holder 200. As shown in FIG. 2, L-shaped top/bottom identification marks 307 are formed under the two lower alignment marks 306.

C. Hologram Standard Holder and Optical Alignment System

Figure 5:
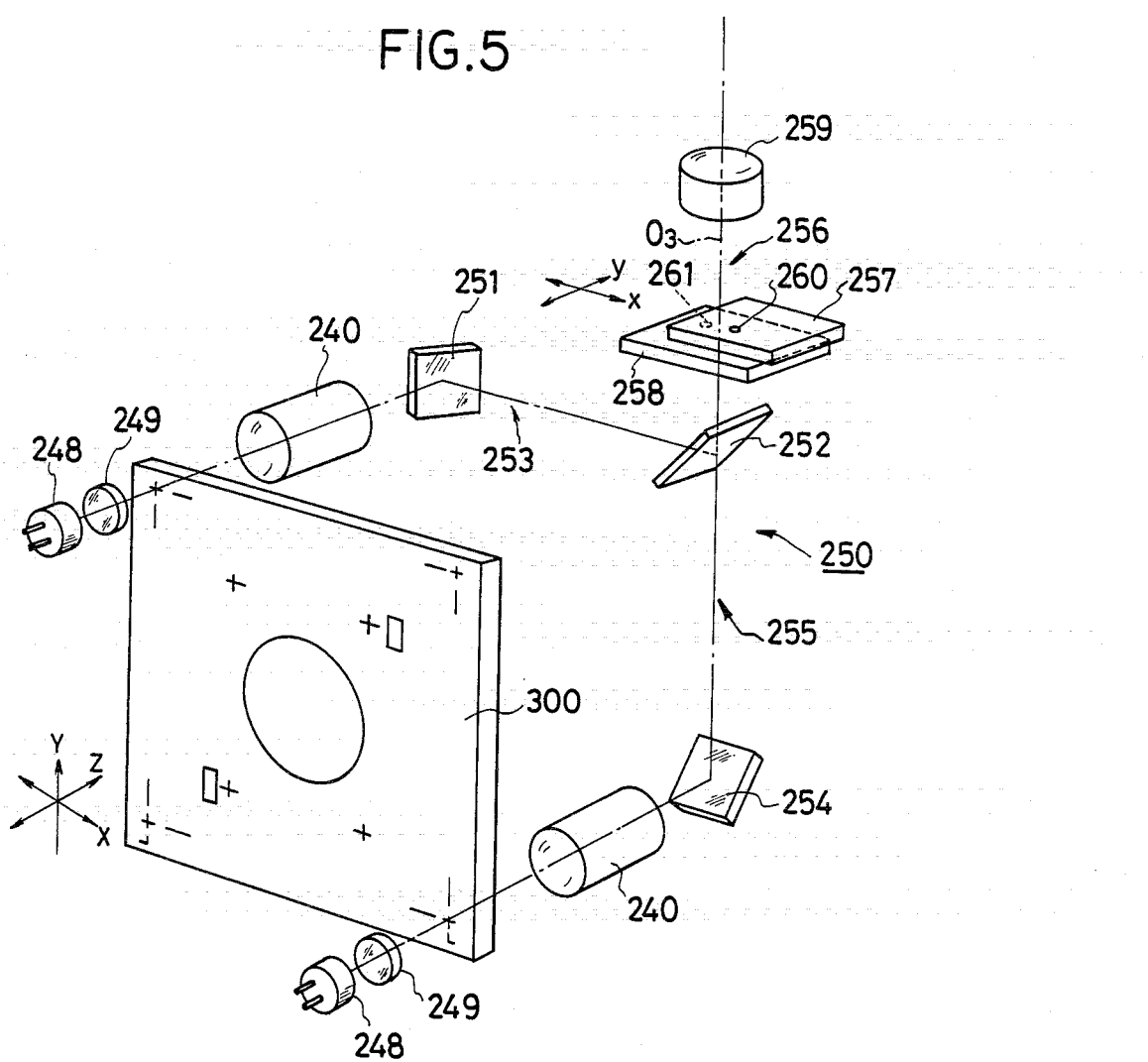
FIG. 5 is a schematic, perspective view of the optical arrangement of the alignment optical system for the hologram standard holder.

FIG. 5 is a perspective view, diagrammatically illustrating the construction of an optical system 250 for aligning the hologram standard 300 which is supported by the hologram standard holder 200.

The optical alignment system 250 comprises: a first optical path 253 consisting of the light-emitting diode 248, the heat-absorbing filter 249, an objective lens 240, a mirror 251 and a beam splitter 252; a second optical path 255 consisting of the light-emitting diode 248, the heat-absorbing filter 249, the objective lens 240, a mirror 254 and the beam splitter 252; and an ocular optical path 256 wherein the first and second optical path 253, 255 are combined by the beam splitter 252.

Figure 6:
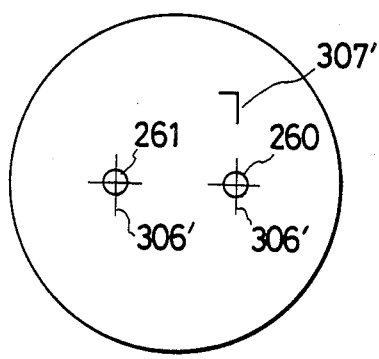
FIG. 6 is an illustration of one example of the ocular visual field of the alignment optical system for the hologram holder of this invention.

The ocular optical path 256 comprises: reticle plates 257, 258 which are moved in the plane perpendicular to an optical axis $O_3$ (the X-Y plane) by means of a known moving means (not shown), and an eyepiece 259. As shown in FIG. 6, the reticle plates 257, 258 have circular indexes 260, 261, respectively.

D. Device for Measuring Off-Axis Angle

Figure 7:
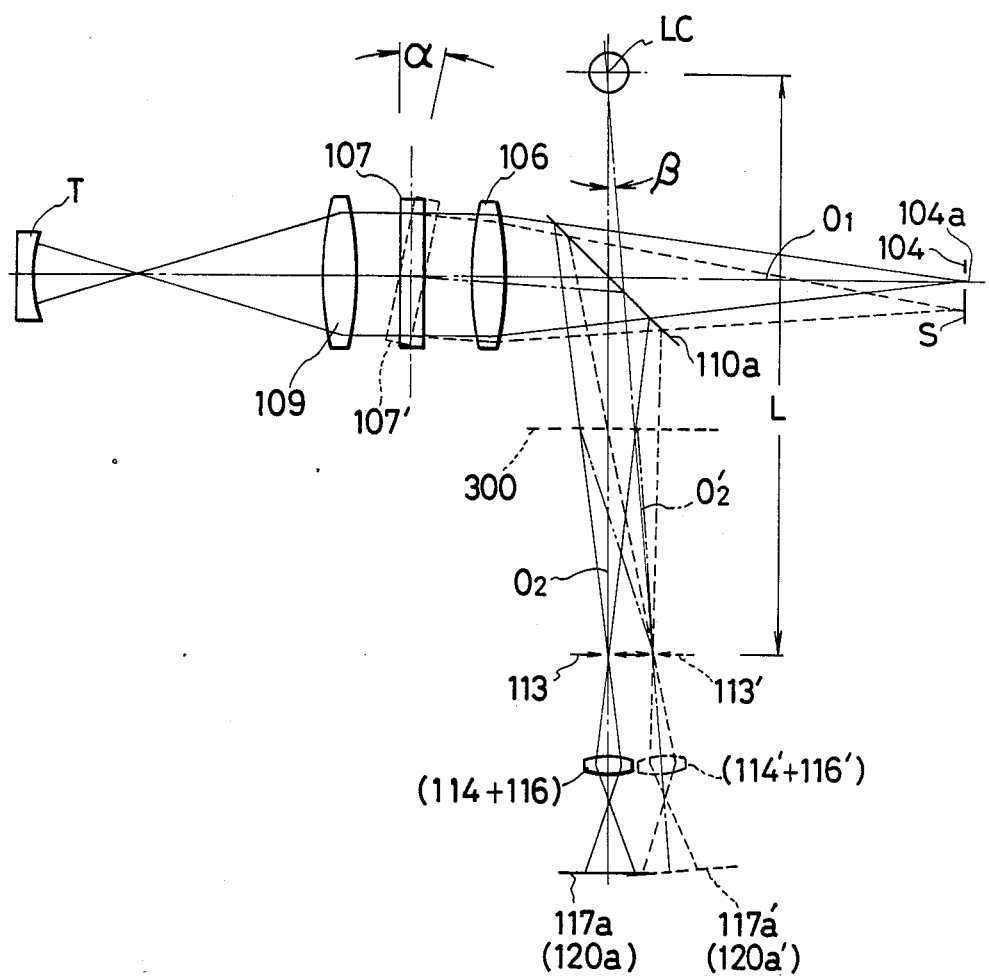
FIG. 7 is a schematic, fragmentary view of the relationship between the optical arrangements of the on-axis and off-axis measurement methods in accordance with the present invention.

FIG. 7 diagrammatically shows an optical arrangement for performing the on-axis and off-axis measurement methods. For the on-axis measurement method, the reference flat plate 107 is disposed perpendicularly with respect to the optical axis $O_1$ of the collimator lens 106. The optical observation system for observing the interference pattern formed between the object and reference beams, namely, the spacial filter 113, the zoom lens 114, the focusing lens 116 and the image pickup tube 117, is disposed on the optical axis $O_2$ perpendicular to the optical axis $O_1$.

The spacial filter 113 is placed at the focal point of the first-order diffracted light formed by the object and reference beams which are diffracted by the hologram standard 300. The interference fringes between the first-order diffracted light of the object and reference lights are picked up by an image pickup tube or recorded by photographic means.

On the other hand, for the off-axis measurement method, as shown by broken lines in FIG. 7, the reference flat surface 107 is inclined at an angle of $\alpha$ to the norm of the surface 107. (This angle $\alpha$ is called an off-axis angle). The optical observation system together with the optical bench 130 is caused to swivel through an angle of $\beta$ about the axis of the swivelling center $\overline{LC}$. The angle of swivel is determined by the following equation:

$$\tan\beta = 2 f \tan \alpha / L$$

(where f is the focal length of the collimator lens.)

As a result, a spacial filter 113' (the spacial filter 113 shifted to an off-axis position) allows only the passage of the first-order diffracted light and the zero-order diffracted light which are obtained from the object light and the reference light through the hologram standard 300, respectively.

The off-axis angle $\alpha$ can be detected from the focal position of the pinhole reticle plate 104 on which a spot light S is focused, the spot light $\underline{S}$ being formed by the light (the reference beam light) reflected from the reference surface 107 which is transmitted through the half-mirror surface 110a of the beam splitter 110. Specifically, the offsets between the focal position of the spot $\underline{S}$ and the optical axis $O_1$ are in proportion to the minute off-axis angle $\alpha$.

FIG. 8 is a diagrammatic plane view of the structure of the pinhole reticle plate 104. The pinhole 104a is formed in one end of the reticle plate 104 and a scale 104 extends longitudinally from the pinhole 104a to the other end. The scale 401 has graduations indicative of the offsets between the optical axis $O_1$ (the center of the pinhole 104a) and the spot $\underline{S}$ corresponding to the off-axis angle $\alpha$, and measurement numbers 402 indicative of the off-axis angles $\alpha$ are formed along the graduations (below the graduations as viewed in FIG. 12).

FIG. 9 is a schematic illustration of the optical arrangement of a microscope 410 used for adjusting the off-axis angle $\alpha$. The microscope 410 includes an objective lens 411, a mirror 412, a focusing lens 413, a diaphragm 414 and an eyepiece 415. The light reflected from the scale 401 on the reticle 104 and the measurement numbers 402 representative of the off-axis angle $\alpha$ is formed into a parallel pencil of rays through the objective lens 411. The mirror 412 reflects the parallel rays directed toward the focusing lens 413, and the rays are focused on the diaphragm 414 through the focusing lens 415. An operator observes the light image projected on the scale 401 and a corresponding one of the measurement numbers 402 representative of the off-axis angle $\alpha$.

FIG. 10 is a schematic illustration similar to FIG. 9, showing the optical arrangement of a microscope 420 used for the on-axis adjustment. The microscope 420 differs from the above-described microscope 410 in the following respects. The mirror 412 is replaced with a half mirror 421, and the objective lens 411 is removed. The focusing lens 413 forms an image in cooperation with the condenser lens 103 of the interferometer.

The off-axis measurement device incorporated in the illustrated embodiment of this invention further possesses the following advantage. Since the scale 401 on the pinhole reticle 104 extends in the same direction as that of the rotation of the flat reference plate 107, even if the projected spot $\underline{S}$ is vertically offset from the scale 401, it is possible to judge that the reference plate 107 is irregularly inclined or is rotated about the optical axis $O_1$. As a result, the status of the reference plate 107 can also be checked.

E. Method of Adjusting Interferometer (a) Regarding setting for the on-axis measurement method (The on-axis arrangement of the measurement optical system)

a-1: As shown by a circle made of a two-dot chain line in FIG. 1, the microscope 420 used for the on axis adjustment is positioned on the optical axis $O_1$ of the collimator lens 106.

a-2: The light beam transmitted through the half mirror 421 of the microscope 420 is focused on the pinhole 104a by the condenser lens 103. Observations are made, through the eyepiece 415, of whether or not the spot image $\underline{S}$ reflected from the reference flat plate 107 is correctly refocused on the pinhole 104a.

Only when the spot agrees with the pinhole 104a, the corresponding spot light can be observed through the eyepiece 415. In this case, the position of the reference flat plate 107 is adjusted so that the spot S can be correctly observed through the eyepiece 415. When the spot S is observed, the reference plate 107 is perpendicular to the optical axis O₁, and the interferometer is set in the on-axis mode.

a-3: The switching circuit 124 is switched so that the image sent from the TV camera 123 of the optical alignment system 125 is displayed on the monitor 118.

Figure 11A:
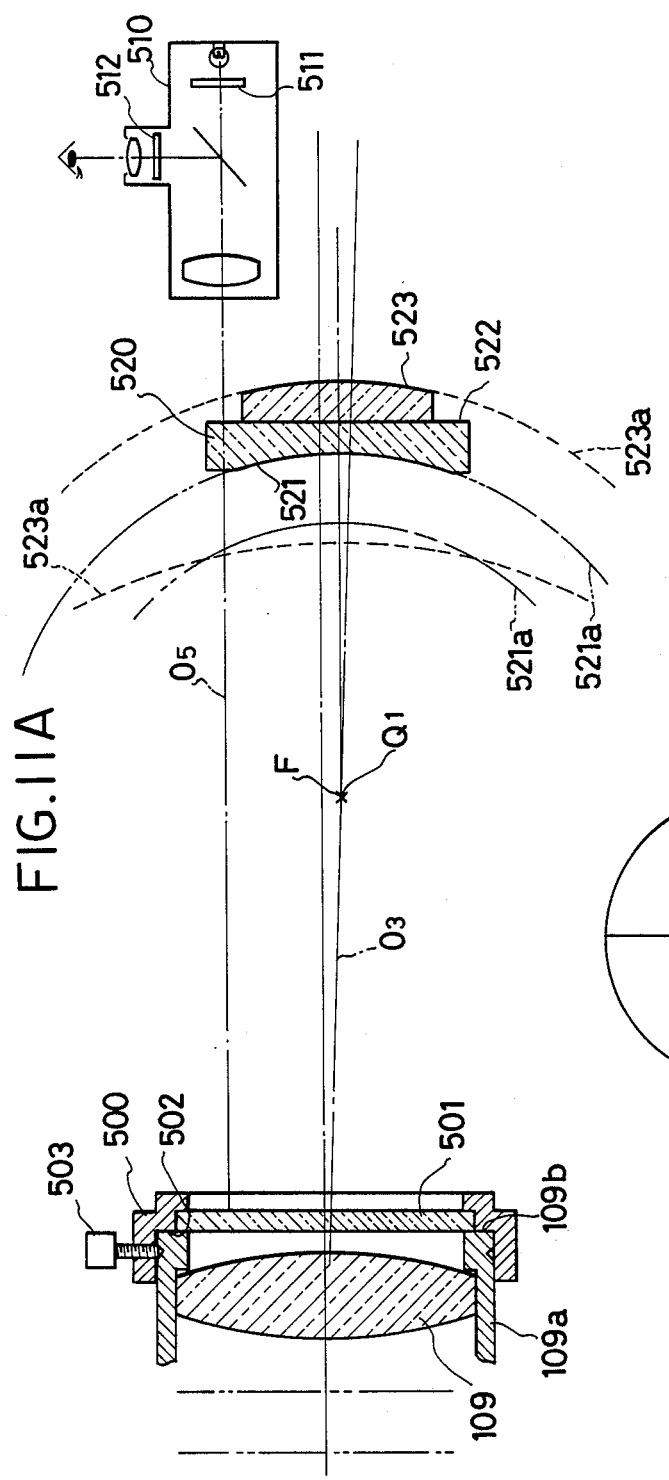
FIG. 11A is a fragmentary, enlarged schematic illustration of the arrangement of a reference lens, an adjustment mirror, an adjustment lens and an automatic collimator which are incorporated in the embodiment of this invention.
Figure 11B:
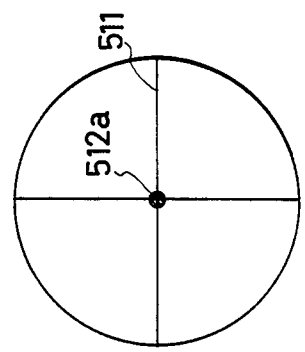
FIG. 11B is a schematic of one example of the visual field of the observation eyepiece of the automatic collimator shown in FIG. 11A.

The monitor 118 displays a state wherein the intersection point of each of the cross-shaped marks on the reticle plate 121 agrees with the spot image which is reflected by the reference plate 107 and has a conjugate relationship with respect to the pinhole 104a.

a-4: The reference lens holder 109a having the reference lens 109 is mounted on the barrel 108 of the interferometer by known holding means (not shown).

a-5: A holder 500 having an adjustment mirror 501 is mounted on the reference lens holder 109a by a mounting screw 503 in such a manner that a reference surface 502 adjoins the reference surface 109b of the reference lens holder 109a (see FIG. 11A).

a-6: The automatic collimator 510 is placed on the optical bench 100, and, as shown in FIG. 11B, the automatic collimator 510 is correctly positioned with respect to the adjustment mirror 501 so that a cross-shaped target 511 is made to agree with a circular index 512a on a reticle 512. Subsequently, the automatic collimator 510 is fixed to the optical bench 100.

a-7: The holder 500 with the adjustment mirror 501 is removed from the reference lens holder 109a.

a-8: An adjustment lens 520 held by a known five-axis holder (not shown) (including the five axes of $\underline{X}$, $\underline{Y}$, $\underline{Z}$, $\phi_A$, $\phi_B$; $\phi_A$ and $\phi_B$ indicate lateral and vertical inclinations) is disposed between the reference lens 109 and the automatic collimator 510. In order to generate a spherical wave 520a of the adjustment lens 520, the adjustment lens 520, as shown in FIG. 11A, is arranged in such a manner that a curvature centure $Q_1$ of a spherical surface 521 is made to agree with a focus $\underline{F}$ of the reference lens 109 and an optical axis 05 of the automatic collimator 510 is orthogonal to a flat surface 522 of the adjustment lens 520.

Firstly, in order to roughly position the adjustment lens 520, the interference fringes between the reference beam reflected from the reference flat plate 107 and the object light (or spherical wave) from the spherical surface 521 of the adjustment lens 520, which are displayed on the monitor 118, are adjusted to be changed into a monochromatic pattern Secondly, the target image 511 is made to correspond to the reticle image 512a while observing a visual image through the eyepiece of the automatic collimator 510, thereby precisely positioning the adjustment lens 520.

(Setting of Adjustment Hologram Standard)

a-9: When an aspherical surface 523 for producing an aspherical wave 523a of the adjustment lens 520 is located in the above-described position where the adjustment lens 520 is held in position, an adjustment hologram standard is closely vacuum-fixed to the X-Y axis movable stage 211 of the hologram standard holder 200. The adjustment hologram standard has either the interference fringes produced by the interference between the object light from the aspherical surface 523 and the reference light from the reference flat plate 107 or the computer hologram which is produced by an electron-beam drawing method on the basis of the interference pattern obtained by a computer operation.

a-10: switching circuit 124 is switched so that the monitor 118 may display the image picked up by the TV camera 117 of the optical system for observing interference fringes.

a-11: The feed screws 208, 216, 217 and 218 are turned so as to adjust to a monochromatic pattern the interference fringes which are produced on the spacial filter 113 by the interference between, for example, the first-order diffracted light of the object light (or aspherical wave) reflected from the aspherical surface 523 of the adjustment lens 520 and the zero-order diffracted light of the reference light reflected from the reference flat plate 107. In consequence, the adjustment hologram standard is adjusted in the X, Y, Z and $\theta$ directions. This completes the positioning of the adjustment hologram standard.

(Regarding the setting of a measurement hologram standard)

a-12: A reticle-moving knob (not shown) is adjusted and the circle indexes 260, 261 on the reticle plate 257 are made to correspond to the alignment mark 306 on the adjustment hologram standard which is aligned at the above-described step (a-11), as shown by one example of the visual image which is observed through the eyepiece 259.

a-13: While observations are being made with the automatic collimator 510, reconfirmation is made as to whether or not the target image 511 corresponds to the reticle index 512a, that is, the adjustment lens 520 is held in position.

If the lens 520 is held in position, it is judged that the setting process described in the steps (a-9) to (a-12) is correctly performed. The automatic collimator 510 and the adjustment lens 520 are removed because they are not needed in the following steps.

a-14: The adjustment hologram standard is removed from the stage 211, and the measurement hologram standard 300 is closely vacuum-fixed to the stage 211.

a-15: While observations are being made through the eyepiece 259 of the hologram standard holder, the feed screws 216, 217 and 218 are adjusted so that the circular indexes 260, 261 of the reticle 257, 258 which are aligned in the above-mentioned step (a-12) may correspond to the alignment marks 306 on the measurement hologram standard 300. Thus the stage 211 is moved together with the hologram standard, thereby positioning the hologram standard.

(Regarding the setting of a test piece)

a-16: The test piece T is set in a known 6-axis holder (including six axes such as x, y, z, $\phi_A$, $\phi_B$ and $\theta$:$\theta$ indicates the rotation about the optical axis).

a-17: The switch circuit 124 is switched so that the monitor 118 may display the image picked up by the TV camera 123 of the optical alignment system 125. The holder which holds the test piece $\underline{T}$ is then adjusted so that the first-order diffracted spot light (normally brighter than zero-order diffracted light) may correspond to the light image of the cross-shaped pattern on the reticle 121 which is displayed on the screen of the monitor 118, with the spot light being converged to the minimum.

a-18: The switching circuit 124 is switched so as to transfer an image to the monitor 118 from the TV camera 117 of the optical system for observing interference fringes. While observing the interference fringes displayed on the monitor 118, the holder is finely adjusted so that the pitches and the directions of the fringes may conform with the measurement results.

(b) Regrading the setting for the off-axis measurement method

For the off-axis measurement method, a step of adjusting the inclination of the reference flat plate 107 is merely added to the above-described on-axis method. The operation of adjusting the inclination of the reference plate 107 is performed in the steps (a-15) and (a-16), that is, after completion of setting the measurement hologram standard. This inclination operation is carried out in accordance with the following steps.

b-1: As shown by a circle formed of a two-dot chain line in FIG. 1, the off-axis adjustment microscope 410 is placed in the vicinity of the position corresponding to a desired off-axis measurement number of the scale 401 formed on the pinhole reticle 104 (on the left side of the reticle 104 as viewed in FIG. 1). Subsequently, while observations are being made through the eyepiece 415, a microscope is adjusted so that a graduation corresponding to the desired off-axis angle, for example, the 2.5° graduation may be positioned to the center of the visual field of the microscope.

b-2: The flat reference plate 107 is inclined so that the spot $\underline{S}$ reflected by the plate 107 may agree with the intersection point of a desired graduation (for example, the 2.5° graduation). The microscope 410 is removed after adjustment of the inclination of the reference plate 107 has been completed.

b-3: The switching circuit 124 is switched so that the monitor 118 may display the image picked up by the TV camera 123 of the optical alignment system 125. The optical bench 130 is made to swivel about the center of swivel LC by operating the micro mechanism 130, thereby corresponding the spot S reflected from the reference plate 107 to the intersection point of the cross-shaped pattern of the reticle plate 121 which is displayed on the monitor 118.

Modifications of the Embodiment (1) The rear surface of the reference lens 109 (or right-hand surface as viewed in FIG. 1) may be employed as a substitution for the reference flat plate 107. In order to perform the off-axis measurement, this reference lens 109 may be replaced with the scale 401 of the pinhole reticle 104. In this case, a line sensor 601 is provided so as to directly receive the spot image $\underline{S}$, and the off-axis angle is detected from the position on the sensor element array where the spot $\underline{s}$ is projected, thereby adjusting the off-axis angle.

(2) There are various modifications of the optical alignment system 250 and the alignment marks 306 for setting the hologram standard 300. Several typical modifications will be briefly explained.

(3-1) According to the modification illustrated in FIG. 17, an area sensor 602 directly receives the image picked up by the objective lens 240 corresponding to the associated alignment mark 306. The position on the sensor 602 where the image is projected is stored in the form of element address data, and adjustment is made so as to cause the associated alignment mark of the measurement hologram standard to correspond to the same element address.

(3-2) The modification illustrated in FIG. 14 has a construction wherein a hollow circular mark 606 is formed as an alignment mark on the hologram standard 300, black circular marks 607 being disposed on the reticle plates 257, 258 of the optical alignment system 250 being in negative-positive relationship with the circular mark 606 and a photosensitive device 608 being placed behind the reticle plate 257 (258). The circular mark 606 is made to correspond to the associated black circular mark 607 on the reticle 257 (258). After the adjustment hologram standard has been set in such a manner that the output of the photosensitive device 608 is zeroed, the reticles 257, 258 are moved. Subsequently, in a similar manner, the measurement hologram standard is adjusted so that the output of the photosensitive device 608 may be zeroed.

Figure 15A:
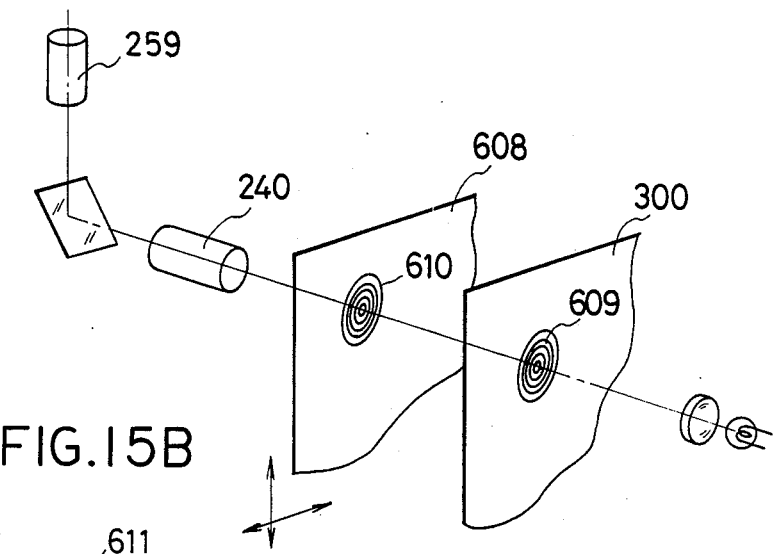
Figure 15B:
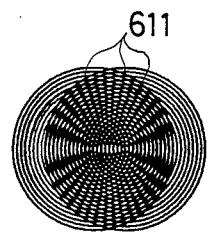

(3-3) The modification illustrated in FIG. 15A is arranged in the following manner. Specifically, a first fine concentric pattern 609 is substituted for the alignment mark 306 on the hologram standard 300. A second concentric pattern 610 having the same shape as that of the first pattern 609 is formed on, for example, a reference plate 608 on the Z-axis movable stage 205; the plate 608 being placed in front of the objective lens 240 and in close proximity to the X-Y axis movable stage 211 in such a manner as to be movable in the plane perpendicular to the optical axis of the objective lens 240. A reference plate 608 having the second concentric pattern 610 is caused to move in such a way that moire fringes 611 (or interference fringes) produced by the interference between the patterns 609 and 610 are erased (see FIG. 15B). With reference to the adjusted position of the reference plate 608 where the moire fringes 611 are erased, the measurement hologram standard is positioned in such a way that the first concentric pattern 609 and the second concentric pattern 610 on the reference plate 608 may not form the above-described moire fringes.

Figure 16:
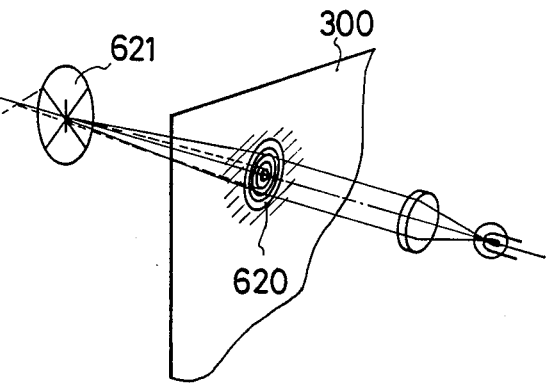

(3-4) The modification shown in FIG. 16 includes a Fresnel lens 620, instead of the alignment marks on the hologram standard 300. Specifically, a quarter-sectioned detector 621 receives the light from the light source, and the detector 621 is moved so that the center of the detector 621 may correspond to the optical axis of the Fresnel lens 620. The measurement hologram standard is set with reference to the position of the detector 621 where the center of the detector 621 corresponds to the optical axis of the Fresnel lens 620.

It should be noted that, if the Fresnel lens 620 is imparted a certain degree of astigmatism, it is also possible to adjust the offset of the hologram standard with respect to the Z-axis direction, that is, the optical axis owing to the difference produced between the outputs from the sectioned elements of the detector 621.

(4) In the modifications shown in FIGS. 17A and 17B, the adjustment lens 520 having the aspherical surface 521 and the aspherical surface 523 is replaced with an adjustment lens 650 having the sole spherical surface 521.

Specifically, the lens 650 is set by executing the above-described steps to (a-8) so that the curvature center $Q_1$ of the spherical surface 521 may agree with the focus $\underline{F}$ of the reference lens 109 and the flat surface 522 is crossed at right angles to the opitcal axis $O_5$ of the automatic collimator 510. Subsequently, the adjustment lens 650, as shown in FIG. 17B, is moved forward or backward by a predetermined distance $\underline{D}$. The wave front reflected by the spherical surface 522 is not a perfectly spherical wave and contains astigmatism, that is, the wave front propagates in the form of an aspherical wave. Therefore, if the interference pattern of the adjustment hologram standard is produced by the interference between this aspherical wave and the reference light from the reference flat surface, the adjustment hologram standard can be correctly set by executing the above-described steps (a-9) to (a-11) by the use of the adjustment hologram standard after the adjustment lens 650 has been moved as shown in FIG. 17B. Furthermore, the measurement hologram standard can be correctly set by carrying out the steps (a-12) to (a-15).

(5) The hologram pattern 301 of the hologram standard 300 described in detail with reference to FIGS. 2 and 4 is of the amplitude type. However, the description is not intended to be in any sense limiting, and, for example, a phase type of hologram pattern may also be utilized.

The invention has thus been shown and described with reference to a specific embodiment, however, it should be noted that the invention is in no way limited to the details of the illustrated interferometer and the like but that changes and modifications may be made witout departing from the scope of the appended claims.

We claim:

1. A method of setting a measurement hologram standard comprising the steps of:
   locating an adjustment hologram standard having a first alignment mark at a predetermined position;
   aligning an index on a reticle at an alignment optical system with said first alignment mark of said adjustment hologram standard;
   removing said adjustment hologram standard from said predetermined position; and
   locating a measurement hologram standard having a second alignment mark which is formed at a location geometrically equivalent to that of said first alignment mark in order that said second alignment mark be coincident with said index, such that said measurement standard can be located at said predetermined position.

2. A method of setting a measurement hologram according to claim 1, wherein said step of locating said adjustment hologram standard at said predetermined position further comprises:
   a first step of locating a reference lens in such a manner that the optical axis of said reference lens coincides with the optical axis of a collimator lens of a holographic interferometer;
   a second step of locating a spherical-wave generating optical surface in such a manner that an optical axis and a curvature center thereof coincide with the optical axis and the focal point of said reference lens, respectively;
   a third step of locating an aspherical-wave generating optical surface at a position which is a predetermined distance away from said spherical-wave generating optical surface along the optical axis thereof; and
   a fourth step of locating said adjustment hologram standard in such a manner as to zero an interference fringe made from a diffracted wave and a nondiffractive wave, such that aid diffracted wave is one of a reference wave and an aspherical wave which is produced by said aspherical-wave generating optical surface, said diffracted wave being diffracted by said adjustment hologram standard, said nondiffracted wave being the other of said reference wave and said aspherical wave, and said nondiffracted wave front being not diffracted by said adjustment hologram standard.

3. A method of setting a measurement hologram standard according to claim 2, wherein said spherical-wave generating optical surface and said aspherical-wave generating optical surface are formed on a single common optical member, said second and third steps being executed at the same time.

4. An apparatus for setting a measurement hologram standard comprising:
   an adjustment hologram standard having a first alignment mark;
   holder means for selectively holding said adjustment hologram standard and a measurement hologram standard having a second alignment mark geometrically equivalent to the position of said first alignment mark;
   alignment means for locating said adjustment hologram standard at a predetermined position by said holder means; and
   alignment optical systems respectively having a movable reticle which is disposed on said holder means and has an index so formed as to correspond to said first and second alignment marks.

5. An apparatus for setting a measurement hologram standard according to claim 4, wherein said alignment means further comprises:
   reference-lens alignment means for positioning a reference lens in such a manner that an optical axis of a collimator lens of a holographic interferometer agrees with the optical axis of said reference lens;
   a spherical-wave generating optical surface arranged such that the optical axis and the curvature center thereof coincide with the optical axis of said reference lens and the focal point of said reference lens, respectively; and
   an aspherical-wave generating optical surface located at a position which is a predetermined distance away from said spherical-wave generating optical surface along the optical axis thereof.

6. An apparatus for setting a measurement hologram standard according to claim 5, wherein said spherical-wave generating optical surface and said aspherical-wave generating optical surface are so formed as to constitute individual optical surfaces of a single adjustment lens, respectively.

7. An apparatus for setting a measurement hologram standard according to claim 6, wherein said adjustment lens further comprises a flat surface formed perpendicular to the optical axis of said spherical-wave generating optical surface, said reference-lens alignment means including an automatic collimator for collimating said flat surface at a right angle to the optical axis of said reference lens.

8. An apparatus for setting a measurement hologram standard according to claim 4, wherein said holder means includes a stage which can be caused to move at least in a plane perpendicular to the optical axis of said apparatus, said hologram standard being placed on said holder means.

9. An apparatus for setting measurement a hologram standard according to claim 4, wherein said alignment mark is constituted by at least two cross-shaped indexes formed orthogonally to each other on the substrate of said hologram standard, said respective alignment optical systems including said reticles, and said alignment optical system comprising: first and second magnifying optical systems for magnifying and collimating said cross-shaped indexes; and a single ocular optical system for observing said respective reticles at the same time.

10. An apparatus for setting a measurement hologram standard according to claim 9, wherein said index on said reticle is a circular index.

* * * * *

UNITED STATES PATENT AND TRADEMARK OFFICE
CERTIFICATE OF CORRECTION

PATENT NO. : 4,812,042

DATED : March 14, 1989

INVENTOR(S) : Takashi Yokokura et al.

It is certified that error appears in the above-identified patent and that said Letters Patent is hereby corrected as shown below:

On page 1, the cover page after "Item [76] Inventors: Takashi Yokokura, Hino; ... all of Japan", please insert -- [73] Assignee: Tokyo Kogaku Kikai Kabushiki Kaisha --. Col. 2, line 8, "refleted" should read -- reflected --. Col. 4, line 22, "ah" should read -- an --. Col. 6, line 15, "is" should read -- as --. Col. 10, line 12, "scale 104" should read -- scale 401 --; line 18, "αare" should read -- α are --. Col. 11, line 1, after "spot" insert -- $\underline{S}$ --. Col. 13, line 6, "Regrading" should read -- Regarding --. Col. 15, line 21, "witout" should read -- without --; line 60, "aid" should read -- said --. Col. 16, line 56, "measurement a" should read -- a measurement --.

Signed and Sealed this

Twenty-sixth Day of September, 1989

Attest:

DONALD J. QUIGG

Attesting Officer

Commissioner of Patents and Trademarks